May 18, 1965 M. P. STENGEL 3,183,864
METHOD AND SYSTEM FOR OPERATING A FURNACE
Filed Feb. 14, 1962
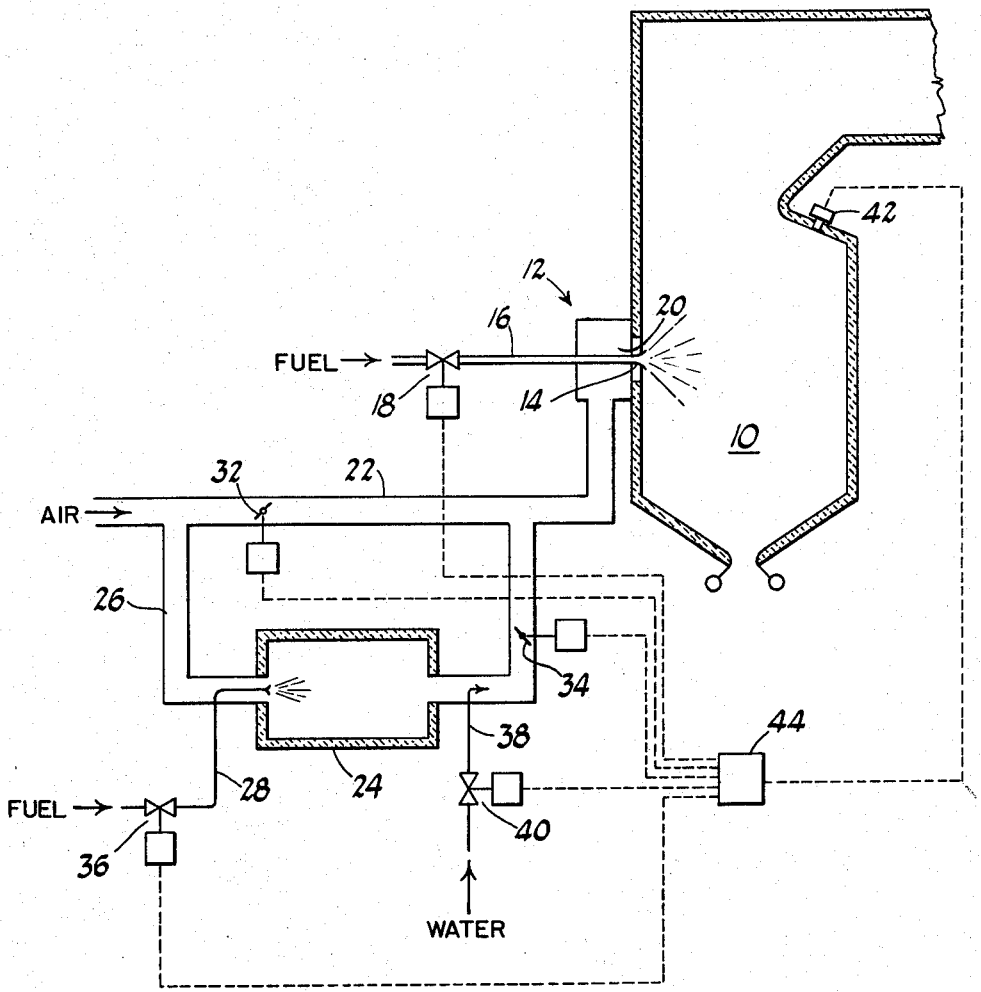
INVENTOR:
MATHEW P. STENGEL
BY Eldon H. Luther
ATTORNEY

United States Patent Office 3,183,864
Patented May 18, 1965

3,183,864
METHOD AND SYSTEM FOR OPERATING A FURNACE
Mathew P. Stengel, Windsor, Conn., assignor to Combustion Engineering, Inc., Windsor, Conn., a corporation of Delaware
Filed Feb. 14, 1962, Ser. No. 173,205
12 Claims. (Cl. 110—1)

This invention relates generally to the art of furnace operation and has particular relation to a method and system for inerting the atmosphere of a furnace for safety purposes.

In the operation of furnaces it is extremely dangerous to permit the atmosphere in the furnace to comprise a fuel-air mixture that is within the inflammable limits since a costly and disastrous explosion may result. In the ordinary firing of a furnace the fuel and air are introduced thereinto in such a manner and at such a rate that the fuel is consumed and burned on the rate basis, i.e., continuously and at the rate of introduction, with the atmosphere in the furnace being inert as a result of combustion gases that are evolved by this "rate" burning process.

As a result of a flame-out in the furnace, with this referring to the flame being extinguished while fuel and air are being supplied to the furnace, caution must be exercised in order to insure that an inflammable furnace atmosphere is not produced. In initially "lighting off" a furnace, it is also necessary to take the necessary precautions to insure that the furnace atmosphere is not inflammable before the "lighting off" procedure is initiated. If such a precaution is not taken and the furnace atmosphere does contain an inflammable mixture of fuel and air an explosion will result at "light off."

The present invention provides a method and system for inerting the furnace in order to insure that the atmosphere in the furnace is not an inflammable mixture of fuel and air, with the method and system of the invention being useful both in the event of a flame-out in the furnace as well as in "lighting off" a furnace initially. In accordance with the invention the main air supply to the burner or burner means of the furnace is throttled and a portion of this main air stream, upstream of the throttling location, is diverted to an inerting burner where this diverting air is used as the combustion supporting medium. Fuel is supplied to the inerting burner with the fuel-air mixture of this burner being slightly air rich, such as having 2 or 3 percent excess air, so that the combustion gases thus produced contain a very small amount of oxygen. These combustion gases are cooled by spraying water into the gas stream thus produced with this water being vaporized thereby increasing the total quantity of inert gases in this stream. This stream of inert gases including the added water vapor is then introduced into the main air stream which passes through the throttling zone and is being conveyed to the burner, with the mixture of this inert gas and air being such that the oxygen content is below the lower limit of flammability of the fuel with which the furnace is fired. This air-inert gas mixture is then introduced into the furnace through the burner with the introduction being for a sufficient time and in sufficient quantity to purge the furnace and insure that there is a non-flammable atmosphere therein.

Accordingly, it is an object of the invention to provide an improved method and system for inerting the atmosphere in a furnace.

Other and further objects of the invention will become apparent to those skilled in the art as the description proceeds.

With the aforementioned objects in view, the invention comprises an arrangement, construction and combination of the elements of the inventive organization in such a manner as to attain the results desired as hereinafter more particularly set forth in the following detailed description of an illustrative embodiment, said embodiment being shown by the accompanying drawing wherein the single figure is a diagrammatic representation of a furnace equipped with the improved system of the invention.

Referring now to the drawing, wherein like reference numerals are used throughout to designate like elements the illustrative and preferred embodiment depicted therein includes the furnace 10, which may be the furnace portion of a steam generator and may have its walls lined with steam generator tubes forming part of the circuit of the steam generator. The furnace is fired by means of a suitable burner assembly 12 that includes the fuel nozzle 14 supplied with a suitable fuel such as pulverized coal, gas or oil through the supply conduit 16 within which may be disposed the valve 18. Also forming part of the burner assembly 12 is the combustion supporting air chamber or distributing means 20 with the main combustion supporting air supply being conveyed to the burner through the duct 22 from a suitable source such as a fan.

In normal operation, fuel and air are supplied to the furnace 10 by the burner 12 in such proportions that efficient burning of the fuel takes place with the fuel being consumed on the rate basis in the furnace so that an explosive atmosphere in the furnace is not produced as long as the fuel is thus burned.

In order to inert the furnace, i.e., introduce into the furnace an adequate supply of sufficiently inert gas to insure that an inflammable fuel-air atmosphere in the furnace will not prevail such as after a flame-out or before the furnace is "lit off" there is provided an inerting burner or furnace 24 which receives its air supply from the main burner combustion supply duct 22 by means of duct 26 with this duct being interconnected with duct 22 and the burner 24. Fuel is introduced into the burner 24 through the fuel supply pipe 28, with the fuel preferably being of the type which is easily ignitable such as number 1 fuel oil. The exhaust gases from burner 24 are conveyed through duct 30 to the main combustion supporting air supply duct 22. Intermediate the connection of ducts 26 and 30 with the duct 22 there is provided in duct 22 a throttling damper 32, with the purpose of this damper being to throttle the flow of the air through supply duct 22 so that a portion of the main combustion supporting air stream will be diverted to the inerting burner 24. Positioned in the duct 30 is the shut-off damper 34 with the purpose of this damper being to close the inerting system which is connected in bypass relation with a portion of duct 22 when the system is inactive or deactivated.

In "lighting off" the furnace 10 it is desired to purge the existing atmosphere in the furnace before "light off" in order to insure that an inflammable fuel-air mixture is not present therewithin. It is also desirable to prevent the forming of an inflammable furnace atmosphere in the event of a flame-out in the furnace. To effect these results the inerting system of the invention is activated to supply the furnace through the air distribution means 20 of burner 10 a gas supply which is sufficiently inert or low in oxygen concentration to be below the lower limit of inflammability of the fuel with which the furnace is fired.

In activating the inerting system, damper 32 is partially closed in order to throttle the flow through duct 22 at the location of this damper and the normally closed shut-off damper 34 in duct 30 is opened. A portion of the main air stream is thus diverted to the inerting burner through duct 26. Fuel is then supplied to this burner through conduit 28, as by opening the valve 36, with the inerting burner then being "lit off" such as by means of a spark igniter or a pilot flame associated with the burner. The hot combustion gases thus developed are conveyed from the burner through duct 30. In order to reduce the temperature of these gases, which will necessarily be very hot, an atomized spray of water is introduced into this gas stream through the water supply system 38 with valve 40 forming part of this system and controlling this introduction of water. This water spray not only has the effect of reducing the temperature of the combustion gases egressing from the inerting burner 24 but increases the quantity of the inert gas in that the water is vaporized. The fuel and air mixture supplied to the inerting burner 24 has a percentage of air slightly in xecess of theoretical so that the air is slightly air rich wherefore complete combustion of the fuel is provided but the oxygen content in the combustion gases thus produced is extremely low.

The inert gas produced by the inerting burner 24 and the water spray is introduced through the duct 30 into the portion of the main air supply which is not diverted through the duct 26 but traverses the throttling damper 32. The amount of inert gas thus introduced into this remaining portion of the main air stream is such that the air-inert gas mixture is sufficiently low in oxygen so that it is below the lower limit of flammability of the fuel with which the furnace is fired.

While it would be possible to provide a substantially completely inert supply, to reduce the oxygen content to a degree that is much below that necessary to insure non-flammability is uneconomical and wasteful in that it involves the burning of more fuel than is actually required. Accordingly, from an efficiency standpoint it is desired to merely reduce the oxygen content of the inerting gas sufficiently low as to insure that any mixture of fuel with this gas will be nonflammable.

By inerting in accordance with the process and system of the invention the readily available main air supply may be used both for the inerting burner and as a source to mix the inert gas with as previously described. This reduces the equipment necessary for inerting and accordingly the cost of the inerting operation.

When inerting after a flame-out, the activation of the inerting system may be automatic in that flame detector 42 may provide a signal indicating that the flame in the furnace has been extinguished. This signal may be conveyed to the controller 44 which in turn through suitable actuators may cause the fuel control valve 18 to close; the throttling damper 32 to move to a throttling position from its normally full open position; the inerting fuel control valve 36 to open; and the shut-off damper 34 to open. The manipulation of the throttling damper, auxiliary fuel valve and water control valve is such as to produce an inert gas-air mixture entering the furnace 10 through the distributing means 20 which has an oxygen content below the lower limit of flammability of the fuel with which the furnace is fired. The furnace is inerted in this manner for a sufficient time and with sufficient inerting gas to insure that a flammable furnace atmosphere does not develop. This may require several minutes with it being preferred that sufficient inert gas be introduced to provide twelve to fifteen changes of the atmosphere in the furnace.

Prior to initially "lighting off" the furnace the inerting system is activated to purge the furnace so as to insure that a nonflammable furnace atmosphere exists prior to the "lighting off" process. Here again the inerting system remains activated to effect a sufficient purge for insuring this result. The gases egressing from the furnace may be tested and when it is found that they are nonflammable after a reasonable purge by the purging system the system may be deactivated and the furnace "lit off."

Illustrative of the operation of the purging system, in a pulverized coal firing system employed with a high capacity vapor generator wherein at full load firing the air flow is 2,810,000 lbs. per hour, an oxygen concentration of 9 percent by weight or less in the inerting gases entering the furnace is sufficient to inert the furnace as previously described. Accordingly, if one-half of the full load air supply is diverted to the inerting burner 24 and number 1 fuel oil utilized in this burner with the fuel-air mixture being such that there is 20 percent excess air with this being provided when .0274 lb. of this fuel oil per lb. of air is utilized and if water is added at the rate of .545 lb. per lb. of air the resulting air-inert gas mixture produced by mixing the inert gases of the inerting system with the nondiverted portion of the main air flow supply will have an oxygen content of approximately 8.67 by weight. If this air-inert gas mixture is supplied to the furnace for two minutes or more inerting of the furnace atmosphere will be provided.

Accordingly with the present invention an inerting method and system is provided which is economically integrated into the fuel and air supply system of the invention and which is effective to inert the furnace atmosphere for safety purposes.

While I have illustrated and described a preferred embodiment of my invention it is to be understood that such is merely illustrative and not restrictive and that variations and modifications may be made therein without departing from the spirit and scope of the invention. I therefore do not wish to be limited to the precise details set forth but desire to avail myself of such changes as fall within the purview of my invention.

What I claim is:

1. In a furnace fired by a suitable burner means which in turn receives combustion supporting air from an air source the process of inerting the furnace characterized by:
    (a) diverting to an inerting zone separate from the furnace a portion of the burner air flow;
    (b) introducing into and burning fuel in said diverted air at this zone in such a manner that there is a small excess of air at said zone;
    (c) introducing water into the hot inert combustion gases produced at said zone and vaporizing the same thereby lowering the temperature of the gases and increasing the quantity of inert gases;
    (d) combining the inert gases including the added water vapor with the remainder of the burner air flow; and
    (e) introducing the air-inert gas mixture into the furnace.

2. In the operation of a furnace into which fuel and air are introduced through suitable main burner means with the fuel being burned therewithin and with the air supporting combustion of the fuel, the method of inerting the furnace comprising:
    (a) establishing a main burner air supply stream;
    (b) throttling said stream at a given location;
    (c) withdrawing a portion of the air from said stream upstream of the throttling location;
    (d) burning fuel at an inerting zone separate from the furnace utilizing this withdrawn air as the combustion supporting medium and with the fuel and air supply at the inerting zone being slightly air rich thereby producing combustion gases with little oxygen therein;
    (e) spraying water into the hot combustion gases thus produced, vaporizing same, thereby increasing the quantity of inert gases and decreasing the temperature thereof;
    (f) introducing the cooled inert gas stream thus produced including added water vapor into the main air stream downstream of said throttling zone; and (g) introducing this air-inert gas mixture into the furnace for a sufficient time to insure that the atmosphere thereof is nonflammable.

3. The process comprising:

(a) introducing a stream of air together with fuel through a burner into a furnace and burning the fuel therewithin with the air supporting combustion thereof;

(b) monitoring the flame in the furnace and in response to the flame being extinguished terminating the fuel supply and throttling the stream of combustion supporting air at a predetermined location;

(c) diverting a portion of the air stream at a location upstream of said throttling location and conveying this withdrawn air to an inerting zone separate from the furnace;

(d) burning fuel at said inerting zone utilizing substantially all of the oxygen in this withdrawn air as combustion supporting medium for the fuel;

(e) spraying water into the products of combustion thus produced vaporizing same; and (f) introducing the inert gas stream thus formed including added water vapor together with the remainder of the air flow into the furnace to inert the atmosphere thereof.

4. In the operation of a furnace wherein a main air stream is conveyed to a burner which supplies fuel and air to the furnace with the fuel being burned therein the method of operation comprising:

(a) incident to a flame-out in the furnace, reducing the oxygen concentration of the air stream supplied to the furnace below the lower limit of flammability of the fuel being fired into the furnace through the burner by diverting a portion of the air stream to and conveying fuel to an inerting zone separate from the furnace with the air-fuel mixture at this zone being slightly air rich;

(b) burning the fuel in said inerting zone;

(c) spraying water into the combustion gases thus produced, vaporizing same, to decrease the temperature thereof and increase the quantity of inert gases;

(d) introducing this inert gas stream including added water vapor into the undiverted portion of the burner air stream with the quantity of inert gases being such that the resulting combination has such a low oxygen concentration as to be below the lower limit of flammability of the fuel introduced through the main burner; and (e) introducing this combination into the furnace through the main burner.

5. In combination a furnace, burner means associated with said furnace, means for supplying fuel and air to the furnace, an inerting system connected with the air supply means and having means to receive a portion of the air normally directed to the burner, said inerting system including an inerting burner means operative to produce inert combustion gases, means for spraying water into the combustion gases thus produced and means for introducing the inert gases including added water vapor into the air supplied to the first mentioned burner means.

6. The organization of claim 5 including duct means conveying the combustion supporting air to the main burner, adjustable throttling means in said duct means, the inerting system in bypass relation with said throttling means being connected with the duct means upstream thereof to receive a portion of the air supply and downstream thereof to introduce inert gas into the remainder of the air supply.

7. The organization of claim 5 including flame detector means operative to detect whether or not the flame in the furnace has been extinguished and means regulated by the flame detector means operative to initiate the inerting system in response to loss of the furnace flame.

8. In a furnace fired by suitable burner means which receives a main fuel supply and receives a supporting combustion air stream, the process of inerting the furnace characterized by:

(a) forming combustion gases by burning a fuel at a location separate from the furnace utilizing a portion of said air stream as the combustion supporting medium;

(b) introducing water into these combustion gases and vaporizing the water thereby cooling said gases and increasing the quantity of inert gases;

(c) providing a mixture of the combustion gases, the water vapor and the remaining portion of the air stream;

(d) burning sufficient fuel and introducing sufficient water so that the oxygen in said mixture is at least below that required to support combustion of the main fuel;

(e) and introducing said mixture into the furnace.

9. In a furnace fired by suitable burner means which receives a main fuel supply and receives a supporting combustion air stream, the process of inerting the furnace characterized by:

(a) forming combustion gases by burning a fuel outwardly of the furnace utilizing a portion of said air stream as the combustion supporting medium;

(b) providing a mixture of the combustion gases and the remaining portion of the air stream;

(c) burning sufficient fuel so that the oxygen in said mixture is at least below that required to support combustion of the main fuel;

(d) and introducing this mixture into the furnace.

10. In a furnace fired by a suitable burner means which in turn receives combustion supporting air from an air source the process of inerting the furnace characterized by:

(a) diverting to an inerting zone outwardly of the furnace a portion of the burner air flow;

(b) introducing into and burning fuel in said diverted air at this zone in such a manner that there is inert gases formed containing a small excess of air at said zone;

(c) combining the inert gases with the remainder of the burner air flow;

(d) and introducing the air-inert gas mixture into the furnace.

11. In the operation of a furnace wherein a main air stream is conveyed to a main burner which supplies fuel and air to the furnace with the fuel being burned therein the method of operation comprising:

(a) monitoring the flame in the furnace and in response to the flame being extinguished terminating the main fuel supply;

(b) forming combustion gases by burning a fuel at a location separate from the furnace utilizing a portion of said air stream as the combustion supporting medium;

(c) introducing water into these combustion gases and vaporizing the water thereby cooling said gases and increasing the quantity of inert gases;

(d) providing a mixture of the combustion gases, the water vapor and the remaining portion of the air stream;

(e) burning sufficient fuel and introducing sufficient water so that the oxygen in said mixture is at least below that required to support combustion of the main fuel;

(f) and introducing this mixture into the furnace through the main burner.

12. In the operation of a furnace wherein a main air stream is conveyed to a main burner which supplies fuel and air to the furnace with the fuel being burned therein the method of operation comprising:

(a) monitoring the flame in the furnace and in response to the flame being extinguished terminating the fuel supply;

(b) forming combustion gases by burning a fuel at a location separate from the furnace utilizing a portion of said air stream as the combustion supporting medium;
(c) providing a mixture of the combustion gases and the remaining portion of the air stream;
(d) burning sufficient fuel so that the oxygen in said mixture is at least below that required to support combustion of the main fuel;
(e) and introducing this mixture into the furnace through the main burner.

References Cited by the Examiner

UNITED STATES PATENTS

| | | | |
|---|---|---|---|
| 2,532,214 | 11/50 | Willenborg | 158—123 |
| 2,533,339 | 12/50 | Willenborg | 158—123 |
| 2,625,298 | 1/53 | Healy et al. | 236—15 |
| 2,714,552 | 8/55 | Martin | 23—281 |
| 2,975,771 | 3/61 | Cunningham | 122—504 |
| 3,103,296 | 9/63 | Gour | 220—88 |

FOREIGN PATENTS

| | | |
|---|---|---|
| 28,456 | 5/07 | Germany. |
| 843,342 | 8/60 | Great Britain. |

JAMES W. WESTHAVER, *Primary Examiner.*

FREDERICK L. MATTESON, JR., PERCY L. PATRICK, *Examiners.*